(12) United States Patent
Senoo

(10) Patent No.: US 10,374,540 B2
(45) Date of Patent: Aug. 6, 2019

(54) SYNCHRONOUS MOTOR HAVING COMPONENT IDENTICAL TO THAT OF ANOTHER KIND OF SYNCHRONOUS MOTOR AND METHOD OF MANUFACTURING SYNCHRONOUS MOTORS

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 17 days.

(21) Appl. No.: 15/678,800

(22) Filed: Aug. 16, 2017

(65) Prior Publication Data

US 2018/0054149 A1    Feb. 22, 2018

(30) Foreign Application Priority Data

Aug. 19, 2016   (JP) ................................ 2016-161336

(51) Int. Cl.
*H02K 1/27* (2006.01)
*H02K 1/28* (2006.01)
*H02P 25/20* (2006.01)
*H02K 17/14* (2006.01)
(Continued)

(52) U.S. Cl.
CPC ............... *H02P 25/20* (2013.01); *H02K 1/28* (2013.01); *H02K 15/02* (2013.01); *H02K 17/14* (2013.01); *H02K 21/16* (2013.01); *H02K 1/27* (2013.01); *H02K 2201/06* (2013.01); *H02K 2213/03* (2013.01)

(58) Field of Classification Search
CPC ............ H02K 1/12; H02K 1/27; H02K 1/276; H02K 2201/06; H02K 15/02; H02K 17/14; H02K 21/16; H02K 2213/03
USPC .......................... 310/156.08, 156.12, 156.47
See application file for complete search history.

(56) References Cited

U.S. PATENT DOCUMENTS 5,397,951 A * 3/1995 Uchida .................. H02K 1/278
                                                        310/156.21
5,760,520 A * 6/1998 Hasebe .................. H02K 1/278
                                                        310/156.15
(Continued)

FOREIGN PATENT DOCUMENTS

DE    102010021595  * 12/2011 ............. H02K 1/278
JP     2001258225 A    9/2001
(Continued)

*Primary Examiner* — Burton S Mullins
(74) *Attorney, Agent, or Firm* — RatnerPrestia

(57) ABSTRACT

A synchronous motor is driven by three phase alternate current. The rotor core includes a laminated body configured by laminating plate members made of electrical steel sheet. Each plate member is formed in a substantially circular shape in a plan view and formed with projections along an outer circumference thereof. The number of slots of the stator is 3xy when variable x is a natural number and variable y is a positive odd number. The number of poles of the rotor is (3y+1)x or (3y−1)x. The number of projections of each plate member is a common measure of (3y+1)x and (3y−1)x. The laminated body has a structure in which the plate members are laminated so that the projections are shifted relative to one another.

8 Claims, 6 Drawing Sheets

(51) Int. Cl.
*H02K 21/16* (2006.01)
*H02K 15/02* (2006.01)

(56) References Cited

U.S. PATENT DOCUMENTS

| | | | | |
|---|---|---|---|---|
| 6,707,209 | B2 * | 3/2004 | Crapo | H02K 1/278 |
| | | | | 310/154.01 |
| 7,425,785 | B2 * | 9/2008 | Domeki | H02K 1/278 |
| | | | | 310/156.38 |
| 9,985,507 | B2 * | 5/2018 | Nakano | H02K 29/03 |
| 2015/0357892 | A1 * | 12/2015 | Nakano | H02K 29/03 |
| | | | | 180/443 |
| 2016/0294235 | A1 * | 10/2016 | Takizawa | H02K 21/14 |

FOREIGN PATENT DOCUMENTS

| | | | | |
|---|---|---|---|---|
| JP | 2008109726 A | | 5/2008 | |
| JP | 2008141799 A | | 6/2008 | |
| JP | 2010-028957 A | | 2/2010 | |
| JP | 2013188005 A | | 9/2013 | |
| KR | 101242403 | * | 3/2013 | ............... H02K 1/24 |

* cited by examiner

SYNCHRONOUS MOTOR HAVING COMPONENT IDENTICAL TO THAT OF ANOTHER KIND OF SYNCHRONOUS MOTOR AND METHOD OF MANUFACTURING SYNCHRONOUS MOTORS

BACKGROUND OF THE INVENTION

1. Field of the Invention

The present invention relates to a synchronous motor and a method of manufacturing synchronous motors.

2. Description of the Related Art

It is known that the output characteristics of a synchronous motor depend on the number of poles of the synchronous motor. The number of poles of a motor corresponds to the number of magnets disposed in the circumferential direction. Generally, the output torque of a motor increases as the number of poles increases. On the other hand, a motor revolves faster as the number of poles is decreased. Therefore, users of motors select a motor with a large or small number of poles suitable to their purposes of using the motor.

Japanese Unexamined Patent Publication No. 2010-28957 discloses an induction motor that can be switched between an operation mode in which the motor revolves at a lower speed with a greater torque and an operation mode in which the motor revolves at a higher speed. This document discloses that the number of poles is changed by changing the drive frequency of the current flowing through three stator windings disposed on the stator.

SUMMARY OF INVENTION

Manufacturers of electric motors manufacture motors having different output characteristics in accordance with the request of the user. Manufacturing motors of more than one kind having different numbers of poles entails changing the structures of the stator and the rotor. For example, it is necessary to manufacture rotor cores of more than one kind having different structures in order to change the number of magnets to be disposed on the rotor. Thus, there has been a problem in that manufacturing motors of more than one kind involves an increased number of components. Further, there has been a problem in that managing components of more than one kind is more troublesome.

An object of the present invention is to provide a synchronous motor having a component that can be used in another synchronous motor having different output characteristics and a method of manufacturing synchronous motors.

A synchronous motor according to the present invention is driven by three phase alternate current. The synchronous motor includes a rotor including a rotor core and magnets fixed to the rotor core as well as a stator including a stator core. The rotor core includes a laminated body configured by laminating plate members made of electrical steel sheet. Each plate member is formed in a substantially circular shape in a plan view and formed with projections along an outer circumference thereof. The number of slots of the stator is $3xy$, where x is a variable representing a natural number and y is a variable representing a positive odd number. The number of poles of the rotor is $(3y+1)x$ or $(3y-1)x$. The number of projections of each plate member is a common measure of $(3y+1)x$ and $(3y-1)x$. The laminated body has a structure in which the plate members are laminated so that the projections are shifted relative to one another. The magnets are fixed between the projections.

In the above-described invention, the number of projections of each plate member is preferably the greatest common measure of $(3y+1)x$ and $(3y-1)x$.

In the above-described invention, the variable y has preferably a value not greater than 3.

Another synchronous motor according to the present invention is driven by three phase alternate current. The synchronous motor includes a rotor including a rotor core and magnets fixed to the rotor core as well as a stator including a stator core. The rotor core includes a laminated body, which is formed by laminating plate members made of electrical steel sheet. Each plate member is formed in a substantially circular shape in a plan view and formed with projections along an outer circumference thereof. The number of slots of the stator is $2xz$, where x is a variable representing a natural number and z is a variable representing a positive multiple of 3. The number of poles of the rotor is $2(z+1)x$ or $2(z-1)x$. The number of projections of each plate member is a common measure of $2(z+1)x$ and $2(z-1)x$. The laminated body has a structure in which the plate members are laminated so that the projections are shifted relative to one another. The magnets are fixed between the projections.

In the above-described invention, the number of projections of each plate member is preferably the greatest common measure of $2(z+1)x$ and $2(z-1)x$.

In the above-described invention, the variable z has preferably a value not greater than 9.

In a method of manufacturing synchronous motors according to the present invention, synchronous motors of more than one kind driven by three phase alternate current are manufactured. The manufacturing method includes a step of forming stators, a step of forming rotors, and an assembly step of assembling the synchronous motors, each synchronous motor assembled by disposing a rotor inside a stator. The step of forming rotors includes a preparation step of preparing plate members, each plate member formed in a substantially circular shape in a plan view and formed with projections along an outer circumference thereof. The step of forming rotors includes a laminating step of forming laminated bodies, each laminated body configured by laminating a plurality of plate members so that the projections are shifted relative to one another. The step of forming rotors includes a step of fixing magnets between the projections of each laminated body. The synchronous motors of more than one kind include first synchronous motor of which the number of slots of the stator is $3xy$ and the number of poles of the rotor is $(3y+1)x$ and second synchronous motor of which the number of slots of the stator is $3xy$ and the number of poles of the rotor is $(3y-1)x$, where x is a variable representing a natural number and y is a variable representing a positive odd number. The step of forming stators includes a step of forming stator cores, the number of slots of each stator core being $3xy$. The preparation step includes a step of preparing plate members, the number of projections of each plate member being a common measure of $(3y+1)x$ and $(3y-1)x$. The laminating step includes a step of forming first laminated body configured so that the projections are shifted relative to one another so as to form regions in which $(3y+1)x$ magnets are disposed and a step of forming second laminated body configured so that the projections are shifted relative to one another so as to form regions in which $(3y-1)x$ magnets are disposed. The assembly step includes a step of assembling the first synchronous motor from the rotor including the first laminated body and the stator, and a step of assembling the second synchronous motor from the rotor including the second laminated body and the stator.

In another method of manufacturing synchronous motors according to the present invention, synchronous motors of more than one kind driven by three phase alternate current are manufactured. The manufacturing method includes a step of forming stators, a step of forming rotors, and an assembly step of assembling the synchronous motors, each synchronous motor assembled by disposing a rotor inside a stator. The step of forming rotors includes a preparation step of preparing plate members, each plate member formed in a substantially circular shape in a plan view and formed with projections along an outer circumference thereof. The step of forming rotors includes a laminating step of forming laminated bodies, each laminated body configured by laminating a plurality of plate members so that the projections are shifted relative to one another. The step of forming rotors includes a step of fixing magnets between the projections of each laminated body. The synchronous motors of more than one kind include first synchronous motor of which the number of slots of the stator is $2xz$ and the number of poles of the rotor is $2(z+1)x$ and second synchronous motor of which the number of slots of the stator is $2xz$ and the number of poles of the rotor is $2(z-1)x$, where x is a variable representing a natural number and z is a variable representing a positive multiple of 3. The step of forming stators includes a step of forming stator cores, the number of slots of each stator core being $2xz$. The preparation step includes a step of preparing plate members, the number of projections of each plate member being a common measure of $2(z+1)x$ and $2(z-1)x$. The laminating step includes a step of forming first laminated body configured so that the projections are shifted relative to one another so as to form regions in which $2(z+1)x$ magnets are disposed and a step of forming second laminated body configured so that the projections are shifted relative to one another so as to form regions in which $2(z-1)x$ magnets are disposed. The assembly step includes a step of assembling the first synchronous motor from the rotor including the first laminated body and the stator, and a step of assembling the second synchronous motor from the rotor including the second laminated body and the stator.

DETAILED DESCRIPTION

With reference to FIG. 1 to FIG. 8, a synchronous motor and a method of manufacturing synchronous motors according to an embodiment will be described. The synchronous motor according to the present embodiment is driven by three phase electric current.

Figure 1:
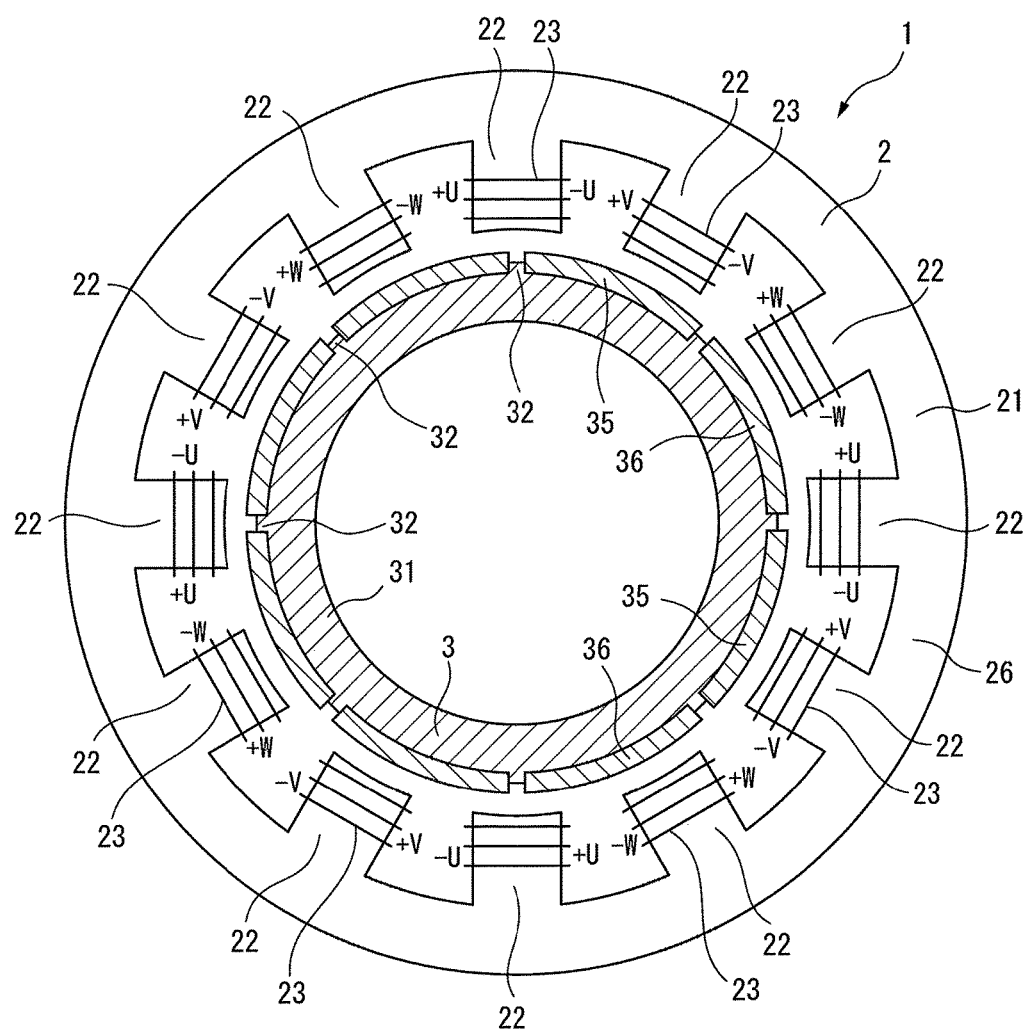
FIG. 1 is a schematic partial cross sectional view of a rotor and a stator of a synchronous motor according to an embodiment.

FIG. 1 shows a schematic partial cross sectional view of the rotor and the stator in the synchronous motor according to the present embodiment. The synchronous motor 1 includes a stator 2 and a rotor 3 that revolves inside the stator 2. The rotor 3 revolves around an axis of rotation. The rotor 3 includes a rotor core 31 made of magnetic material and a plurality of magnets 35, 36 fixed to the rotor core 31. The cross section of the rotor 3 according to the present embodiment is in a circular shape. The cross section of the rotor 3 is not limited to this shape but may be in a substantially circular shape. For example, the cross section of the rotor 3 may be in a polygonal shape. The rotor core 31 according to the present embodiment is formed in a cylindrical shape. The rotor core 31 according to the present embodiment is formed by a laminated body of plate members as will be described below.

The magnets 35, 36 are disposed on the surface of the rotor core 31 in a circumferential direction in a row. The magnets 35 and the magnets 36 are disposed with a space in between. Each of the magnets 35, 36 is shaped in such a way as to extend along the axis of rotation of the rotor core 31. The magnets 35, 36 according to the present embodiment are permanent magnets. The outer surface of each magnet 35 is the north pole and the outer surface of each magnet 36 is the south pole. The magnets 35, 36 are disposed so that north poles and south poles alternate on the outer surface along the circumferential direction of the rotor core 31.

Projections 32 are formed in the circumferential direction on the surface of the rotor core 31. The projections 32 are disposed so that, when the rotor core 31 is seen from the front side, the projections 32 are arranged with an interval between one another. The magnets 35, 36 are disposed between the projections 32. The magnets 35, 36 are fit between the projections 32. In other words, each of the magnets 35, 36 is held in its position by being clamped between projections 32.

The stator 2 is supported by a housing. The stator 2 is an unmovable member. The stator 2 includes a stator core 21 made of magnetic material. The stator core 21 includes a tubular part 26 formed in a tubular shape and a plurality of teeth 22 formed in such a way as to protrude from the tubular part 26 inward. The tubular part 26 according to the present embodiment is formed in a cylindrical shape.

The teeth 22 are formed in such a way as to extend along the axis of rotation of the rotor 3. Coils 23 are formed by winding wiring around the teeth 22. The spaces between adjacent teeth 22 are called slots. The teeth 22 are disposed opposite to the rotor 3. Gaps are formed between the magnets 35, 36 and the teeth 22.

The synchronous motor 1 illustrated in FIG. 1 has eight magnets 35, 36 disposed on the rotor 3. In other words, the synchronous motor 1 is an 8-pole synchronous motor. The stator 2 is formed with 12 teeth 22. The synchronous motor 1 is a synchronous motor having 12 slots. In other words, the synchronous motor 1 illustrated in FIG. 1 is an 8-pole 12-slot synchronous motor.

The number of poles and the number of slots of a synchronous motor may be any number as long as the rotor revolves when electric current is applied to the motor. Table 1 illustrates examples of relations between the number of poles and the number of slots in synchronous motors.

TABLE 1

| Pair | Type | Number of Poles:Number of Slots | Type | Number of Poles:Number of Slots |
|---|---|---|---|---|
| A | A1 | 2:3 | A2 | 4:3 |
| B | B1 | 4:6 | B2 | 8:6 |
| C | C1 | 10:12 | C2 | 14:12 |
| D | D1 | 8:9 | D2 | 10:9 |
| E | E1 | 22:24 | E2 | 26:24 |

Table 1 lists ratios between the number of poles and the number of slots. For example, the synchronous motor 1 illustrated in FIG. 1 is a synchronous motor 1 having 8 poles and 12 slots. The ratio between the number of poles and the number of slots is 2:3. In other words, the synchronous motor illustrated in FIG. 1 corresponds to the synchronous motor of Type A1 in Table 1.

Table 1 lists pairs A to E of synchronous motors having the same number of slots and different numbers of poles. In each pair A to E, the number of poles of a synchronous motor listed on the right-hand side, e.g., Type A2, B2, C2 is greater than the number of poles of the corresponding synchronous motor listed on the left-hand side, e.g., Type A1, B1, C1. As the number of poles increases, current frequency per revolving speed of the motor increases, and when the motor is driven at a greater speed, iron loss increases. On the other hand, as the number of poles increases, the output torque of the motor increases.

When an object driven by a motor is rotated at a high speed while curbing heat generation, it is preferable to select a synchronous motor having a smaller number of poles, listed on the left-hand side of Table 1. In contrast, when a great torque is necessary even if the rotation speed is low, it is preferable to select a synchronous motor having a larger number of poles, listed on the right-hand side of Table 1. For example, in the pair A, the synchronous motors of Type A1 and Type A2 have the same number of slots and different numbers of poles from each other. Since the synchronous motor of Type A2 has a larger number of poles than the synchronous motor of Type A1, the former has characteristics of a greater torque and a lower rotation speed. As has been described, there exist synchronous motors of more than one kind having the same number of slots and different numbers of poles.

The synchronous motors of more than one kind having the same number of slots have the same number of teeth 22 for their stator cores 21. Therefore, when the stator cores 21 have tubular parts 26 of the same shape as well as teeth 22 of the same shape, the stator cores 21 are of the same shape. However, the phase of the alternate current applied to each coil 23 needs to be selected appropriately in accordance with the number of poles of the synchronous motor.

A three phase alternate current is applied to the coils 23 according to the present embodiment. The three phase alternate current has U phase, V phase, and W phase. The synchronous motor 1 illustrated in FIG. 1 has wiring for these phases disposed clockwise in the order of U phase, V phase, and W phase when seen from the front.

Figure 2:
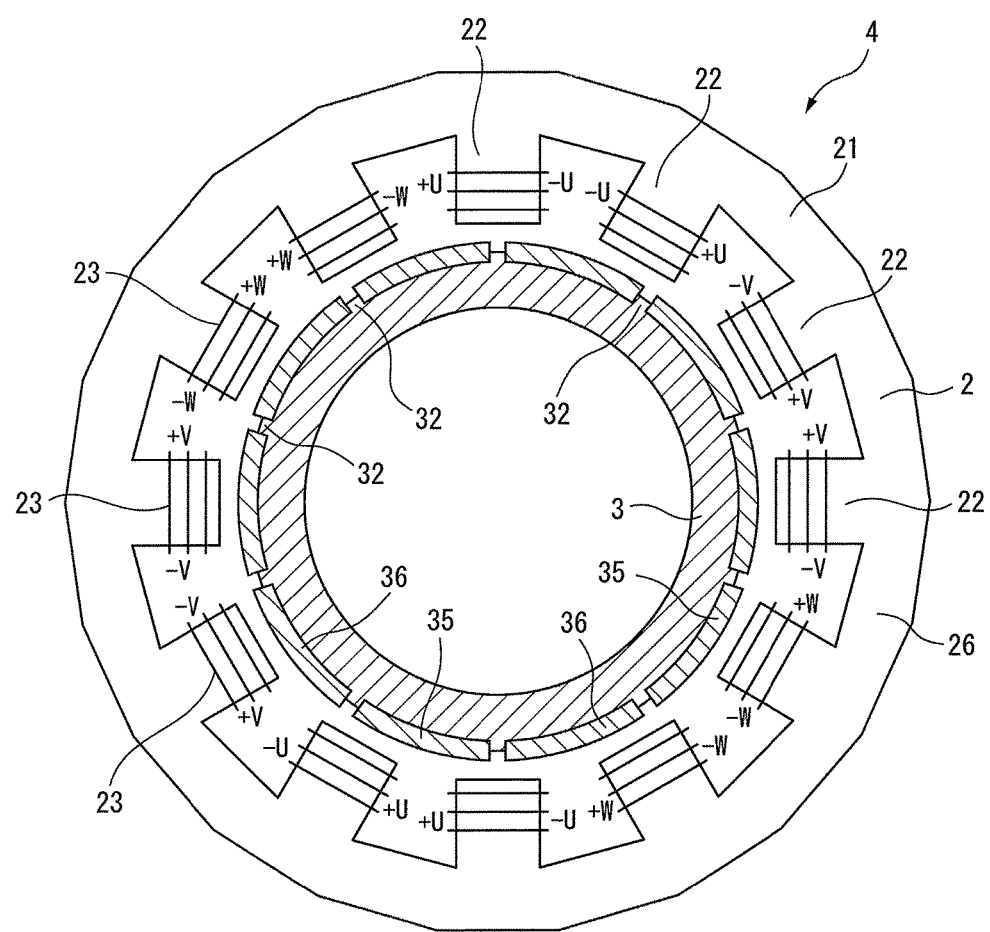
FIG. 2 is a schematic partial cross sectional view of the rotor and the stator of a synchronous motor according to a comparative example.

FIG. 2 shows a schematic partial cross sectional view of a synchronous motor according to a comparative example. The synchronous motor 4 of the comparative example has 10 poles and 12 slots. The synchronous motor 4 of the comparative example has the same number of slots as the synchronous motor 1 in FIG. 1. The synchronous motor 4 of the comparative example has a different number of poles from the synchronous motor 1 in FIG. 1. An AC current is applied to the coils 23 of the synchronous motor 4 of the comparative example with the phases of the current arranged in the order of U phase, U phase, V phase, V phase, W phase, and W phase clockwise. The comparison between the synchronous motor 4 of the comparative example and the synchronous motor illustrated in FIG. 1 reveals that the numbers of the slots are identical but the phases of the AC current at respective coils are different. When the stators of the two kinds of synchronous motors 1 and 4 are manufactured, two kinds of electric circuits need to be manufactured for applying AC currents with different phases.

On the other hand, synchronous motors of more than one kind having the same number of slots for the stators but different numbers of poles can be driven in some cases simply by mutually replacing V phase and W phase.

Figure 3:
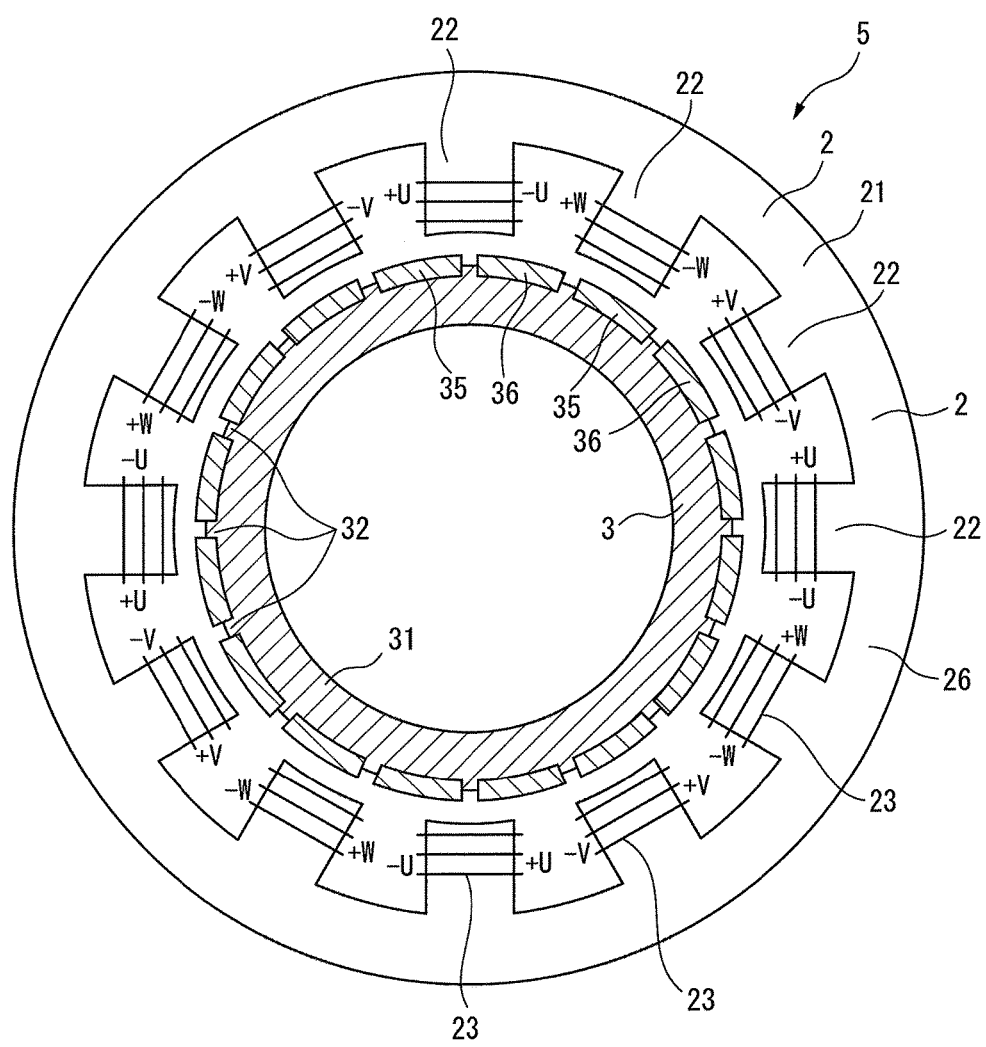
FIG. 3 is a schematic partial cross sectional view of the rotor and the stator of another synchronous motor according to the embodiment.

FIG. 3 shows a schematic partial cross sectional view of another synchronous motor according to the present embodiment. The synchronous motor 5 illustrated in FIG. 3 is a synchronous motor having 16-pole and 12-slot. The synchronous motor 5 has the same number of slots as the synchronous motor 1 illustrated in FIG. 1. The number of poles of the rotor 3 of the synchronous motor 5 is different from that of the synchronous motor 1 in FIG. 1. AC current is applied to the coils 23 of the synchronous motor 5 with the phases of the current arranged in the order of U phase, W phase, and V phase clockwise. This phase arrangement corresponds to a phase arrangement obtained by mutually replacing V phase and W phase of the AC current in FIG. 1.

For example, when the synchronous motor 1 illustrated in FIG. 1 and the another synchronous motor 5 illustrated in FIG. 3 are to be manufactured, two kinds of stators can be manufactured by providing terminals to be connected to a three phase alternate current power source with the V phase terminal and the W phase terminal mutually replaced.

Such a pair of numbers of poles corresponds to a case in which the number of slots is represented by a variable b, the number of poles of one synchronous motor is represented by a variable a, and the number of poles of the other synchronous motor is (2b−a). Table 1 lists pairs of synchronous motors that satisfy this condition. For example, the phase arrangement of wiring of the stator of the synchronous motor of Type A1 is similar to that of the stator of the synchronous motor of Type A2. The stator of the synchronous motor of Type A2 can be obtained by mutually replacing V phase and W phase of the stator of the synchronous motor of Type A. Similarly, the stator of the synchronous motor of Type B2 can be obtained by mutually replacing V phase and W phase of the stator of the synchronous motor of Type B1.

As described above, Table 1 lists the numbers of poles and the numbers of slots for such pairs of synchronous motors in which the stator of the other synchronous motor can be manufactured by mutually replacing V phase and W phase of the stator of one of the synchronous motors.

In a method of manufacturing synchronous motors according to the present embodiment, two kinds of synchronous motors constituting such a pair of synchronous motors are manufactured. The two kinds of synchronous motors have rotors of approximately the same outer diameter. The two kinds of synchronous motors have stators of approximately the same outer diameter and teeth of approximately the same size. In the present embodiment, synchronous motors of more than one kind having the same number of slots and different numbers of poles from each other are manufactured.

There are many pairs of synchronous motors having a same number of slots and allowing two kinds of stators to be manufactured by mutually replacing V phase and W phase as shown in Table 1. The inventor has found that the number of poles and the number of slots of two kinds of synchronous motors having this characteristic can be established based on either of the two relations described in the following.

In the first relation, wherein x is a variable representing a natural number and y is a variable representing a positive odd number, the number of slots of the two kinds of synchronous motors is 3xy, the number of poles of one of the synchronous motors is (3y+1)x, and the number of poles of the other synchronous motor is (3y−1)x. For example, when the variable x is 1 and the variable y is 1, the number of slots is 3, the number of poles is 4 or 2. This corresponds to the pair A of synchronous motors of Type A1 and Type A2 in Table 1.

In the second relation, wherein x is a variable representing a natural number and z is a variable representing a positive multiple of 3, the number of slots of the two kinds of synchronous motors is 2xz, the number of poles of one of the synchronous motors is 2(z+1)x, and the number of poles of the other synchronous motor is 2(z−1)x. For example, when the variable x is 1 and the variable z is 3, the number of slots is 6 and the number of poles is 4 or 8. In other words, this corresponds to the pair B of synchronous motors of Type B1 and Type B2 in Table 1.

As described above, by selecting values for variables x, y, and z, it is possible to find pairs of synchronous motors having a same number of slots and allowing stators to be manufactured simply by mutually replacing V phase and W phase. These pairs of synchronous motors allow two kinds of stators to be easily manufactured.

According to the present embodiment, two kinds of synchronous motors include first synchronous motor and second synchronous motor. The number of slots and the numbers of poles of the two kinds of synchronous motors satisfy the above-described first relation or second relation. For example, the synchronous motor 1 in FIG. 1 can be regarded as first synchronous motor and the synchronous motor 5 in FIG. 3 can be regarded as second synchronous motor.

The rotor core of the rotor according to the present embodiment is formed by a laminated body of plate members. The first rotor core 31 of the first synchronous motor 1 is formed by first laminated body configured by laminating plate members. The second rotor core 31 of the second synchronous motor 5 is formed by second laminated body configured by laminating plate members identical to the plate members of the first laminated body.

Figure 4:
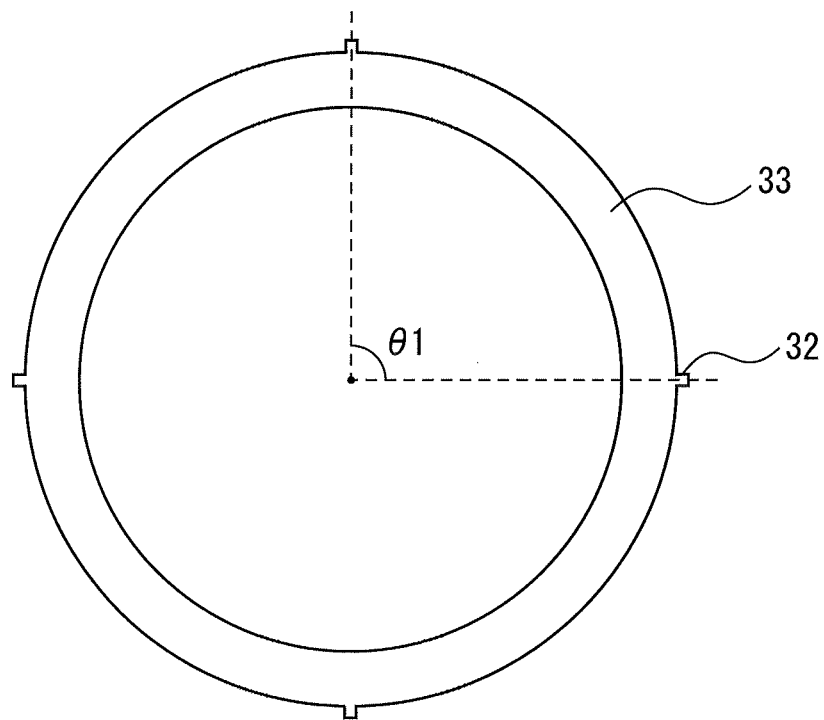
FIG. 4 is a plan view of a plate member forming the rotor core according to the embodiment.

FIG. 4 shows a plan view of a plate member for forming a rotor core according to the present embodiment. The plate member 33 according to the present embodiment is made of electrical steel sheet. The plate member 33 has an outer circumference formed in a substantially circular shape in a plan view. The plate member 33 has projections 32 that protrude outward from the outer circumference. The first rotor core and the second rotor core are manufactured by laminating plate members 33, common plate members 33 used for both rotor cores.

Figure 5:
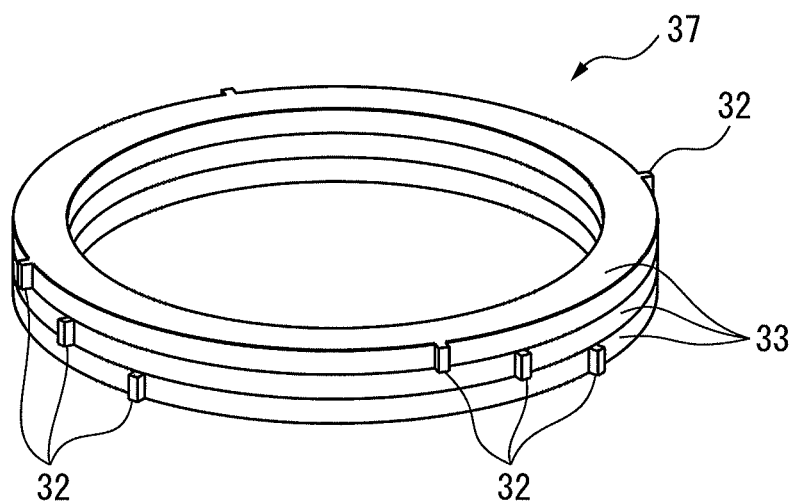
FIG. 5 is a perspective view of a laminated body configured by laminating plate members.

FIG. 5 shows a perspective view of a laminated body configured by laminating plate members. The laminated body 37 is configured by laminating plate members 33 so that the projections 32 are shifted relative to one another. The plate members 33 are laminated in such a manner that the projections 32 are in rotated positions at a predetermined central angle. The shifted amount between the projections 32 is determined according to the number of poles of the synchronous motor.

With reference to FIG. 1 and FIG. 3, the first laminated body forming the rotor core 31 of the first synchronous motor 1 has as many magnets 35, 36 disposed between projections 32 as the poles of the first synchronous motor. The second laminated body forming the rotor core 31 of the second synchronous motor 5 has as many magnets 35, 36 disposed between projections 32 as the poles of the second synchronous motor. According to the present embodiment, two kinds of laminated bodies are configured by changing the angles at which the projections 32 are shifted.

The rotor cores 31 for the two kinds of synchronous motors 1, 5 can be manufactured from one kind of plate member 33. Thus, the two kinds of rotor cores can be easily manufactured. Further, as described above, the second stator core 21 of the second synchronous motor 5 is identical to the first stator core 21 of the first synchronous motor 1. V phase and W phase of the current that are applied to the coils wound around the teeth of the stator cores are mutually replaced.

The synchronous motors of more than one kind according to the present embodiment have common stator cores. The phases of electric current applied to the coils disposed on the stator cores of the stators are different from one kind of synchronous motor to another. The rotor cores of synchronous motors of more than one kind are formed by common plate members. Each rotor core is formed by a laminated body of plate members. Each laminated body has plate members laminated so that the projections are shifted at a central angle determined according to the number of poles.

As described above, synchronous motors according to the present embodiment allow rotor cores to be manufactured using identical components. Stators can also be manufactured using identical components. In other words, a component for one synchronous motor may be commonly used for another synchronous motor having different output characteristics. Therefore, two kinds of synchronous motors can be manufactured with fewer components. Further, the trouble of managing components of more than one kind can be limited.

Next, a method of manufacturing such two kinds of synchronous motors will be described in detail. The method of manufacturing synchronous motors includes a step of forming stators and a step of forming rotors. The method of manufacturing synchronous motors includes an assembly step of assembling synchronous motors, each synchronous motor assembled by disposing the rotor inside the stator.

According to the present embodiment, the step of forming rotors includes a step of manufacturing rotor cores by laminating plate members made of electrical steel sheet. The step of forming stators includes a step of manufacturing stator cores by laminating plate members made of electrical steel sheet.

In the step of forming rotors, a preparation step of preparing plate members is performed first. With reference to FIG. 4, a plurality of plate members 33 are formed from electrical steel sheet. A plate member 33 can be punched out from the electrical steel sheet with, for example, a pressing machine. In other words, a plate member 33 can be formed by pressing a die matching the shape of a plate member 33 onto the electrical steel sheet.

Next, as illustrated in FIG. 5, a laminating step of forming laminated bodies by laminating a plurality of plate members 33 is performed. The plate members 33 are laminated so that the projections 32 of adjacent plate members 33 are shifted relative to each other. The plate members 33 are laminated in rotated positions at a predetermined central angle one after another. When the rotor core is seen from the front (seen in the axial direction), as many projections 32 as a predetermined number of poles are disposed (see FIG. 1 and FIG. 3). Further, when the rotor core is seen from the front, the plate members 33 are laminated so that projections 32 are disposed at equal intervals. A laminated body 37 configured by laminating a predetermined number of plate members 33 forms a rotor core.

In the preparation step, the number of projections 32 formed on each plate member 33 can be a common measure of the numbers of poles of the two kinds of synchronous motors. For example, in the first relation, the number of projections 32 can be set to a common measure of $(3y+1)x$ and $(3y-1)x$. In the second relation, the number of projections 32 can be set to a common measure of $2(z+1)x$ and $2(z-1)x$. Note that a common measure used herein is not smaller than 2. Any common measure from the smallest common measure to the greatest common measure can be selected as the number of the projections 32.

In this example, a pair of synchronous motors satisfying the second relation will be illustrated wherein variable x is 2 and variable z is 6. In other words, there will be described a case of manufacturing the first synchronous motor with 28 poles and 24 slots and the second synchronous motor with 20 poles and 24 slots.

A common measure of the numbers of poles of the two kinds of synchronous motors is selected, which is 4 in this case, as the number of projections 32 on each plate member 33. With reference to FIG. 4, four projections 32 are formed on the surface of the plate member 33. The projections 32 are disposed at equal intervals in the circumferential direction when the plate member 33 is seen in a plan view. The projections 32 are formed in this example with a central angle $\theta 1$ of 90° (360°/4) between every adjacent pair of projections 32.

With reference to FIG. 5, the laminating step of laminating plate members 33 is performed so that the positions of the projections 32 are shifted relative to one another. In the laminating step, the projections 32 are disposed with equal intervals in the circumferential direction between each other when the rotor core is seen from the front.

Figure 6:
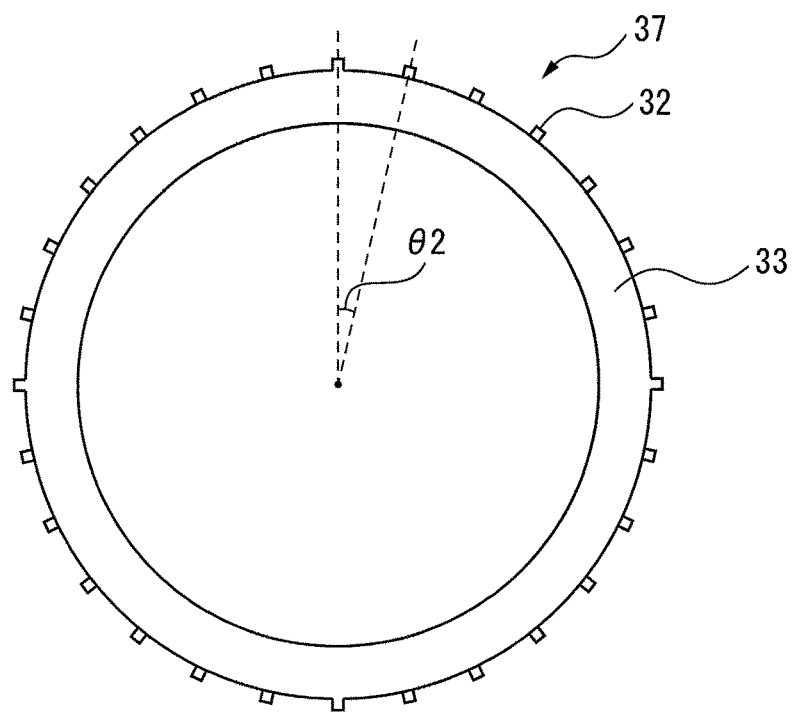
FIG. 6 is a front view of first rotor core formed by first laminated body.

FIG. 6 shows a front view of first laminated body of the first synchronous motor, configured by laminating plate members. Since the first synchronous motor has 28 poles, the projections 32 are disposed around the laminated body 37 so that 28 projections 32 are arranged when the laminated body 37 is seen from the front. The first laminated body 37 of the first synchronous motor is configured by laminating the plate members 33 so that each plate member is shifted relative to the adjacent plate member by a central angle $\theta 2$ of about 12.8° (360°/28). The first rotor core can be formed by laminating a predetermined number of plate members 33.

Figure 7:
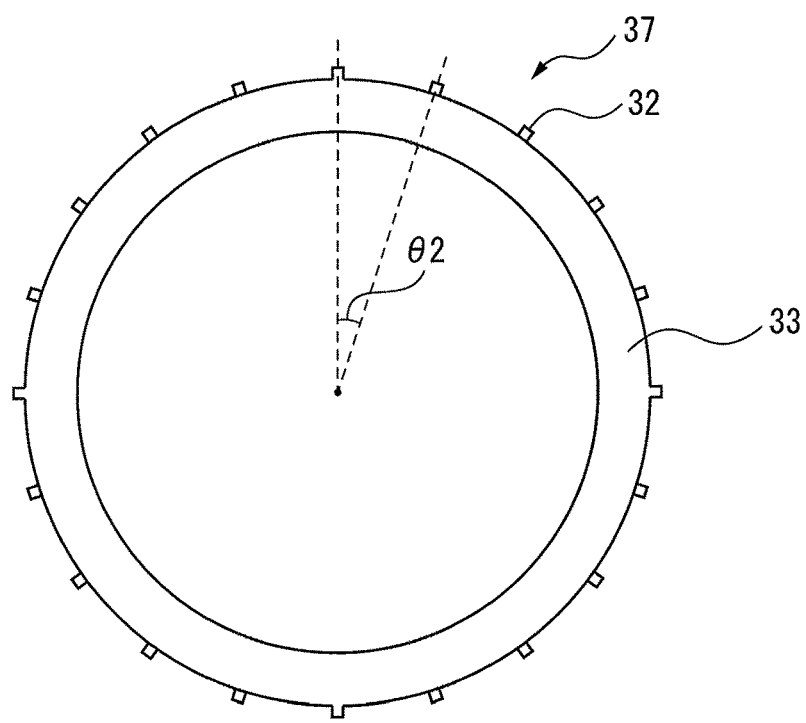
FIG. 7 is a front view of second rotor core formed by second laminated body.

FIG. 7 shows a front view of second laminated body of the second synchronous motor, configured by laminating plate members. Since the second synchronous motor has 20 poles, the projections 32 are disposed around the laminated body 37 so that 20 projections 32 are arranged when the laminated body 37 is seen from the front. The second laminated body 37 of the second synchronous motor is configured by laminating the plate members 33 so that each plate member is shifted relative to the adjacent plate member by a central angle $\theta 2$ of about 18° (360°/20). As described above, the central angle at which plate members 33 are rotated relative to each other is selected at (360°/number of poles). By selecting an angle at which the projections are shifted relative to each other according to the number of poles, rotor cores of more than one kind can be formed using common plate members 33. The second rotor core can be formed by laminating a predetermined number of plate members 33.

Next, the step of fixing magnets 35, 36 between the projections 32 of each laminated body is performed. The magnets are disposed on the laminated body in the circumferential direction with north poles and south poles alternating on the outer surfaces of the magnets. By adopting this step, the first rotor and the second rotor can be formed. Thus, the rotors of two kinds of synchronous motors can be manufactured.

Figure 8:
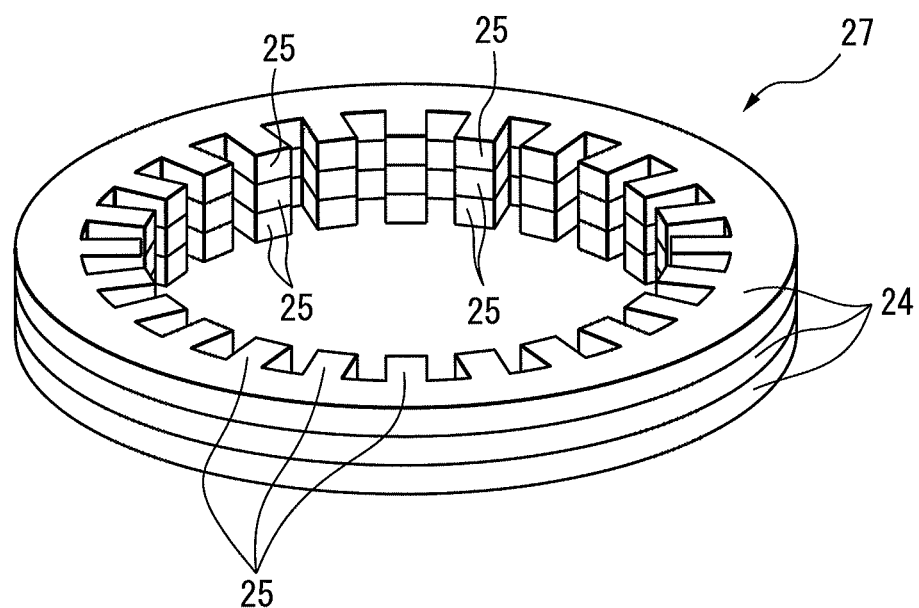
FIG. 8 is a perspective view of a laminated body of plate members constituting a stator core.

FIG. 8 shows a perspective view of the laminated body for describing a method of manufacturing stators according to the present embodiment. The stator cores also can be manufactured by laminating plate members 24 made of electrical steel sheet. Each stator core according to the present embodiment is formed by a laminated body 27 configured by laminating plate members 24.

Each plate member 24 is formed by punching an electrical steel sheet by press machining. At this stage, protrusions 25 protruding inward are formed in the plate member 24. The protrusions 25 are laminated so as to form the teeth of the stator core. Plate members 24 are laminated with the protrusions 25 in alignment so as to form a laminated body 27. The laminated body 27 formed by laminating a predetermined number of plate members 24 corresponds to the stator core. Next, coils are formed by winding the conductive wire around the teeth of the stator core.

Next, the assembly step of assembling synchronous motors is performed, each synchronous motor assembled by disposing a rotor inside a stator. The assembly step includes a step of assembling first synchronous motor from the first rotor and a stator. Further the assembly step includes a step of assembling second synchronous motor from the second rotor and a stator. Each coil is connected to a power source via an electrical circuit. Thus two kinds of synchronous motors having different numbers of poles from each other can be manufactured.

In the method of manufacturing synchronous motors according to the present embodiment, plate members for a rotor core and plate members for a stator core can be formed from one electrical steel sheet. For example, plate members of a rotor core and plate members of a stator core may be punched out of one electrical steel sheet at one time by using one die. Adoption of this manufacturing method allows the plate member for the stator core and the plate member for the rotor core to be formed at the same time. In other words, this manufacturing method improves the efficiency in manufacturing the stator cores and the rotor cores.

In the step of forming plate members, plate members for the stator core may be formed from one electrical steel sheet while forming plate members for the rotor core from another electrical steel sheet.

As described above, in the method of manufacturing synchronous motors according to the present embodiment, stators of two kinds of synchronous motors can be manufactured by using identical stator core. Further, two kinds of stators can be manufactured by mutually replacing V phase and W phase of the phases of the electric current applied to the coils around the teeth. As for the rotors, two kinds of rotor cores can be manufactured by forming laminated bodies with projections disposed at different positions from each other while using identical plate members.

In the method of manufacturing synchronous motors according to the present embodiment, identical stator components and identical rotor components are used for the synchronous motors. The number of component type for manufacturing synchronous motors of more than one kind can be reduced. This improves the productivity in manufacturing synchronous motors.

Since some of the components are identical, the number of dies used for pressing machining can be reduced. In the conventional techniques, manufacturing rotors having different numbers of poles entailed the use of dies adapted to the different numbers of poles of the rotors. However, in the method of manufacturing synchronous motors according to the present embodiment, only one kind of plate members are used for rotor cores, allowing two kinds of rotor cores to be manufactured using one die.

In the step of manufacturing rotor cores, by using plate members with a small number of projections formed thereon, identical plate members can be used for synchronous motors other than the above-described pair of synchronous motors. On the other hand, plate members with a greater number of projections formed thereon provide more supports for the magnets disposed on the surface of the rotor core. Therefore, as the number of projections of the plate members increases, the deviations of the magnets can be suppressed more efficiently. The greatest number of projections that allows identical plate members for rotor cores to be used for two kinds of synchronous motors is the greatest common measure among the common measures between the numbers of poles of the two kinds of rotors.

In the above-described first relation, the greatest number of projections is the greatest common measure of $(3y+1)x$ and $(3y-1)x$. In the above-described second relation, the greatest number of projections is the greatest common measure of $2(z+1)x$ and $2(z-1)x$. Thus, by forming plate members with as many projections as the greatest common measure, magnets are supported by many projections. As a result, the deviations of magnets fixed to the rotor can be suppressed.

Notching press machining is known as a technique for punching electrical steel sheets in manufacturing plate members of a stator core and plate members of a rotor core using a press machine. For example, a numerically controlled notching press machine can be used in order to perform notching press machining.

In notching press machining, a partial region of a workpiece is punched and then the workpiece is rotated at a predetermined angle. A next region of the workpiece is then punched. By repeating the process of punching a partial region of the workpiece and rotating the workpiece, punching is performed over all regions of the workpiece. In notching press machining, punching is performed a plurality of times for producing one plate member.

For example, in the example illustrated in FIG. 6 to FIG. 8, the angle (angle around the rotational axis) of a single rotational movement of the plate member 24 of the stator core or the plate member 33 of the rotor core is set at 30°. By repeating punching 12 times by a notching press machine, punching is performed in the circumferential direction all around the workpiece. By performing notching press machining in this way, a small die for the notching press machine can be used.

In the manufacturing step of plate members using a notching press machine, the number of regions into which one workpiece is divided can be set at a common measure of the numbers of poles of the two kinds of synchronous motors. By dividing the workpiece into regions by a common measure of the numbers of poles, two kinds of plate members can be formed using an identical die.

Further, by dividing a workpiece into a larger number of regions, a smaller region is machined each time. This enables a use of a smaller die. For example, the greatest common measure in two kinds of synchronous motors may be selected as the number of projections of each plate member. A smaller die can be used by dividing the workpiece into regions by the greatest common measure of the numbers of poles of the two kinds of synchronous motors. For example, when the greatest common measure of the number of poles of two kinds of rotors is 4, the number of the projections may be 4. Punching can be performed using a die for machining the region corresponding to a central angle of 90° (360°/4).

According to the present embodiment, two kinds of synchronous motors having different output characteristics from each other are manufactured. It is preferable that the two synchronous motors constituting a pair have widely different output characteristics. For example, in the first relation, when the variable y is 5 and the variable x is 1, the number of slots of the two kinds of synchronous motors is 15. The numbers of poles of the two kinds of synchronous motors are 16 and 14. Since the numbers of poles of the two kinds of synchronous motors differ by only 12.5% ((16−14)/16), the output characteristics of the motors are not widely different.

It is preferable to manufacture two kinds of synchronous motors having widely different numbers of poles in order to obtain widely different output characteristics. When the rotation speed of a synchronous motor is constant, the drive frequency is proportional to the number of poles. Iron loss is approximately in proportion to the square of drive frequency. Table 2 lists the ratios between the numbers of poles and the squares of the drive frequencies when the value of the variable y is changed in the first relation. The ratios between the numbers of poles correspond to the ratios between the drive frequencies. Each ratio between the numbers of poles is constant irrespective of the value of the variable x. Accordingly, in Table 2, the variable x is an arbitrary natural number.

TABLE 2

| y | (Greater) Number of Poles | (Smaller) Number of Poles | ((Smaller) Number of Poles)/((Greater) Number of Poles) | (Ratio between Drive Frequencies)$^2$ |
|---|---|---|---|---|
| 1 | 4x | 2x | 0.500 | 0.250 |
| 3 | 10x | 8x | 0.800 | 0.640 |
| 5 | 16x | 14x | 0.875 | 0.766 |
| 7 | 22x | 20x | 0.909 | 0.826 |
| 9 | 28x | 26x | 0.929 | 0.863 | x: an arbitrary natural number.

From Table 2 it is found that the smaller the variable y is, the smaller the square of the ratio between the drive frequencies is. In other words, it is found that the smaller the variable y is, the greater the reduction in iron loss is in two kinds of synchronous motors. It is found that by selecting a pair of synchronous motors having smaller numbers of poles, two kinds of synchronous motors with widely different output characteristics can be manufactured.

For example, the value of the variable y is preferably not more than 3 so as to limit the ratio between the numbers of poles to not more than 0.8. By selecting a small value for the variable y, two kinds of synchronous motors having widely different torques and rotation speeds can be manufactured.

Similarly, Table 3 lists the ratios between the numbers of poles and the squares of the drive frequencies corresponding to values of the variable z in the second relation. In Table 3 also, the variable x is the arbitrary natural number.

TABLE 3

| z | (Greater) Number of Poles | (Smaller) Number of Poles | ((Smaller) Number of Poles)/((Greater) Number of Poles) | (Ratio between Drive Frequencies)$^2$ |
|---|---|---|---|---|
| 3 | 8x | 4x | 0.500 | 0.250 |
| 6 | 14x | 10x | 0.714 | 0.510 |
| 9 | 20x | 16x | 0.800 | 0.640 |
| 12 | 26x | 22x | 0.846 | 0.716 |
| 15 | 32x | 28x | 0.875 | 0.766 |
| 18 | 38x | 34x | 0.895 | 0.801 |
| 21 | 44x | 40x | 0.909 | 0.826 |
| 24 | 50x | 46x | 0.920 | 0.846 | x: an arbitrary natural number.

In the third relation also, it is found that the smaller the variable z is, the smaller the square of the ratio between the drive frequencies is. In other words, it is preferable to select a small value for the variable z. For example, the variable z is preferably not more than 9 so as to limit the ratio between the numbers of poles to not more than 0.8. By selecting a small value for the variable z, two kinds of synchronous motors having widely different torques and rotation speeds can be manufactured.

According to the present invention, a synchronous motor having a component that is commonly used in a synchronous motor having different characteristics and a method of manufacturing synchronous motors are provided.

The above-described embodiments may be combined as appropriate. In the drawings referred to above, identical or corresponding parts are denoted by the same numerals. Note that the above-described embodiments are for illustrative purposes only and are not intended to limit the invention in any way. Furthermore, the embodiments encompass any modification of an embodiment in the scope of the appended claims.

The invention claimed is:

1. A synchronous motor driven by three phase alternate current, comprising:
a rotor including a rotor core and magnets fixed to the rotor core; and
a stator including a stator core; wherein
the rotor core includes a laminated body configured by laminating plate members made of electrical steel sheet;
each plate member is formed in a substantially circular shape in a plan view and formed with projections along an outer circumference;
the number of slots of the stator is 3xy, the number of poles of the rotor is (3y+1)x or (3y−1)x, and the number of projections of each plate member is a common measure of (3y+1)x and (3y−1)x, when variable x is a natural number and variable y is a positive odd number;
the laminated body has a structure in which the plate members are laminated so that the projections are shifted relative to one another; and
the magnets are fixed between the projections.

2. The synchronous motor according to claim 1, wherein the number of projections of each plate member is the greatest common measure of (3y+1)x and (3y−1)x.

3. The synchronous motor according to claim 1, wherein the variable y has a value not greater than 3.

4. A synchronous motor driven by three phase alternate current, comprising:
a rotor including a rotor core and magnets fixed to the rotor core; and
a stator including a stator core; wherein
the rotor core includes a laminated body configured by laminating plate members made of electrical steel sheet;
each plate member is formed in a substantially circular shape in a plan view and formed with projections along an outer circumference;
the number of slots of the stator is 2xz, the number of poles of the rotor is 2(z+1)x or 2(z−1)x, and the number of projections of each plate member is a common measure of 2(z+1)x and 2(z−1)x, when variable x is a natural number and variable z is a positive multiple of 3;
the laminated body has a structure in which the plate members are laminated so that the projections are shifted relative to one another; and
the magnets are fixed between the projections.

5. The synchronous motor according to claim 4, wherein the number of projections of each plate member is the greatest common measure of 2(z+1)x and 2(z−1)x.

6. The synchronous motor according to claim 4, wherein the variable z has a value not greater than 9.

7. A manufacturing method of manufacturing synchronous motors of more than one kind driven by three phase alternate current, the method comprising:
a step of forming stators;
a step of forming rotors; and
an assembly step of assembling the synchronous motors, each synchronous motor assembled by disposing a rotor inside a stator; wherein
the step of forming rotors includes:
a preparation step of preparing plate members, each plate member formed in a substantially circular shape in a plan view and formed with projections along an outer circumference;
a laminating step of forming laminated bodies, each laminated body configured by laminating a plurality of plate members so that the projections are shifted relative to one another; and
a step of fixing magnets between the projections of each laminated body; wherein
the synchronous motors of more than one kind include first synchronous motor of which the number of slots of the stator is 3xy and the number of poles of the rotor is (3y+1)x and second synchronous motor of which the number of slots of the stator is 3xy and the number of poles of the rotor is (3y−1)x, when variable x is a natural number and variable y is a positive odd number;
the step of forming stators includes a step of forming stator cores, the number of slots of each stator core being 3xy;
the preparation step includes a step of preparing plate members, the number of projections of each plate member being a common measure of (3y+1)x and (3y−1)x;
the laminating step includes a step of forming first laminated body configured so that the projections are shifted relative to one another so as to form regions in which (3y+1)x magnets are disposed and a step of forming second laminated body configured so that the projections are shifted relative to one another so as to form regions in which (3y−1)x magnets are disposed; and
the assembly step includes a step of assembling the first synchronous motor from the rotor including the first laminated body and the stator, and a step of assembling the second synchronous motor from the rotor including the second laminated body and the stator.

8. A manufacturing method of manufacturing synchronous motors of more than one kind driven by three phase alternate current, the method comprising:

a step of forming stators;

a step of forming rotors; and an assembly step of assembling the synchronous motors, each synchronous motor assembled by disposing a rotor inside a stator; wherein the step of forming rotors includes:

a preparation step of preparing plate members, each plate member formed in a substantially circular shape in a plan view and formed with projections along an outer circumference;

a laminating step of forming laminated bodies, each laminated body configured by laminating a plurality of plate members so that the projections are shifted relative to one another; and a step of fixing magnets between the projections of each laminated body; wherein the synchronous motors of more than one kind include first synchronous motor of which the number of slots of the stator is 2xz and the number of poles of the rotor is $2(z+1)x$ and second synchronous motor of which the number of slots of the stator is 2xz and the number of poles of the rotor is $2(z-1)x$, when variable x is a natural number and variable z is a positive multiple of 3;

the step of forming stators includes a step of forming stator cores, the number of slots of each stator core being 2xz;

the preparation step includes a step of preparing plate members, the number of projections of each plate member being a common measure of $2(z+1)x$ and $2(z-1)x$;

the laminating step includes a step of forming first laminated body configured so that the projections are shifted relative to one another so as to form regions in which $2(z+1)x$ magnets are disposed and a step of forming second laminated body configured so that the projections are shifted relative to one another so as to form regions in which $2(z-1)x$ magnets are disposed; and the assembly step includes a step of assembling the first synchronous motor from the rotor including the first laminated body and the stator, and a step of assembling the second synchronous motor from the rotor including the second laminated body and the stator.

* * * * *